(12) United States Patent
Veneroni et al.

(10) Patent No.: US 10,208,136 B2
(45) Date of Patent: Feb. 19, 2019

(54) PROCESS FOR THE ISOLATION OF SULFONYL FLUORIDE POLYMERS AND POLYMERS OBTAINED THEREFROM

(71) Applicant: SOLVAY SPECIALTY POLYMERS ITALY S.P.A., Bollate (IT)

(72) Inventors: Alessandro Veneroni, Novate Milanese (IT); Claudio Oldani, Parabiago (IT); Martina Corasaniti, Caronno Pertusella (IT); Alessandro Ghielmi, Frankfurt am Main (DE)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 76 days.

(21) Appl. No.: 15/245,868

(22) Filed: Aug. 24, 2016

(65) Prior Publication Data

US 2017/0198065 A1     Jul. 13, 2017

Related U.S. Application Data

(63) Continuation of application No. 13/502,478, filed as application No. PCT/EP2010/065921 on Oct. 22, 2010.

(30) Foreign Application Priority Data

Oct. 29, 2009   (EP) .................................. 09174439

(51) Int. Cl.
| | | |
|---|---|---|
| *C08J 5/18* | (2006.01) | |
| *C08F 6/22* | (2006.01) | |
| *C08F 2/22* | (2006.01) | |
| *C08F 14/18* | (2006.01) | |
| *C08F 214/18* | (2006.01) | |
| *C08J 5/22* | (2006.01) | |
| *C08F 214/26* | (2006.01) | |

(52) U.S. Cl.
CPC ................ *C08F 6/22* (2013.01); *C08F 2/22* (2013.01); *C08F 14/18* (2013.01); *C08F 214/18* (2013.01); *C08F 214/26* (2013.01); *C08J 5/18* (2013.01); *C08J 5/225* (2013.01); *C08J 2327/12* (2013.01); *C08J 2327/18* (2013.01)

(58) Field of Classification Search
CPC .... C08F 6/22; C08F 2/22; C08F 14/18; C08F 214/18; C08F 214/26; C08J 5/18; C08J 5/225; C08J 2327/12; C08J 2327/18

USPC ......................................................... 524/805
See application file for complete search history.

(56) References Cited

U.S. PATENT DOCUMENTS

| | | | |
|---|---|---|---|
| 4,940,525 A | 7/1990 | Ezzell et al. | |
| 5,654,109 A | 8/1997 | Plowman et al. | |
| 6,211,314 B1 | 4/2001 | Kruger et al. | |
| 6,667,377 B2 * | 12/2003 | Feiring ................. | C07C 317/44 524/280 |
| 2003/0153700 A1 | 8/2003 | Wu et al. | |
| 2005/0228061 A1 | 10/2005 | Wlassics et al. | |
| 2007/0185293 A1 | 8/2007 | Ameduri et al. | |

FOREIGN PATENT DOCUMENTS

| | | |
|---|---|---|
| EP | 498076 A1 | 8/1992 |
| EP | 1167400 A1 | 1/2002 |
| EP | 1172382 A2 | 1/2002 |
| EP | 1239000 A1 | 9/2002 |
| EP | 1323751 A2 | 7/2003 |
| EP | 1403958 A1 | 3/2004 |
| EP | 1535935 A1 | 6/2005 |
| EP | 1589062 A2 | 10/2005 |
| EP | 1666508 A1 | 6/2006 |
| EP | 1667265 A1 | 6/2006 |
| EP | 2270818 A1 | 1/2011 |
| WO | 09709373 A1 | 3/1997 |
| WO | 9945045 A1 | 9/1999 |
| WO | 01058577 A1 | 8/2001 |
| WO | 2003050150 A1 | 6/2003 |
| WO | 2009116446 A1 | 9/2009 |
| WO | WO-2009116446 A1 * | 9/2009 ................ C08F 2/26 |

OTHER PUBLICATIONS

Standard ASTM E1131, "Standard Test Method for Compositional Analysis by Thermogravimetry", 1986, pp. 644-648; 5 pgs.
Standard ASTM D1238, "Standard Test Method for Melt Flow Rates of Thermoplastics by Extrusion Plastometer", 2004, A 00246980, pp. 1-13; 13 pgs.

* cited by examiner

*Primary Examiner* — Kelechi C Egwim

(57) ABSTRACT

The invention relates to a process for the isolation of (per)fluorinated polymers containing sulfonyl fluoride functional groups from a polymerization latex. The process comprises adding the polymerization latex to an aqueous electrolyte solution under high shear stirring at a temperature equal to or lower than the glass transition temperature of the polymer. The invention further relates to the (per)fluorinated polymers containing sulfonyl fluoride functional groups isolated by the process and characterised by a loss of weight at 200° C. lower than 1% as determined by thermogravimetric analysis.

3 Claims, No Drawings

PROCESS FOR THE ISOLATION OF SULFONYL FLUORIDE POLYMERS AND POLYMERS OBTAINED THEREFROM

CROSS-REFERENCE TO RELATED APPLICATIONS

This application is a continuation application of U.S. application Ser. No. 13/502,478, filed Apr. 17, 2012, which a U.S. national stage entry under 35 U.S.C. § 371 of International Application No. PCT/EP2010/065921 filed Oct. 22, 2010, which claims priority to European application No. 09174439.1 filed on Oct. 29, 2009. The entire contents of each of these applications are explicitly incorporated herein by reference for all purposes.

TECHNICAL FIELD

The invention relates to a process for the isolation of (per)fluorinated polymers containing sulfonyl fluoride functional groups from a polymerization latex and to the polymers obtained therefrom.

The invention further relates to a process for the preparation of a polymerization latex comprising (per)fluorinated polymers containing sulfonyl fluoride functional groups characterized by a high rate of incorporation of the functional monomer into the polymer chain and by the high molecular weight of the polymer.

BACKGROUND ART (Per)fluorinated polymers containing sulfonyl fluoride functional groups are known in the prior art as precursors for a class of ion exchange (per)fluorinated polymers generally referred to as "ionomers".

Due to their ionic properties, (per)fluorinated ionomers are suitable in the manufacture of electrolyte membranes for electrochemical devices such as fuel cells, electrolysis cells, lithium batteries.

Fuel cells are electrochemical devices that produce electricity by catalytically oxidizing a fuel, such as hydrogen or methanol. Among known fuel cells of particular interest are proton exchange membrane (PEM) fuel cells which employ hydrogen as the fuel and oxygen or air as the oxidant. In a typical PEM fuel cell, hydrogen is introduced into the anode portion, where hydrogen reacts and separates into protons and electrons. The membrane transports the protons to the cathode portion, while allowing a current of electrons to flow through an external circuit to the cathode portion to provide power. Oxygen is introduced into the cathode portion and reacts with the protons and electrons to form water and heat.

The membrane requires an excellent ion conductivity, gas barrier properties (to avoid the direct mixing of hydrogen and oxygen), mechanical strength and chemical, electrochemical and thermal stability at the operating conditions of the cell.

One of the most important requirements for the long-term functioning of a PEM fuel cell is the ability of the membrane to maintain a suitable water content in the membrane itself to ensure the required level of ion conductivity.

Fuel cell membranes, when operated using dry reactants and high operating temperatures, have a tendency to dry out with a negative impact on their proton transport capabilities, which in turn causes a loss in cell efficiency. Moreover, if the water transport through the membrane is not efficient, the water which is produced at the cathode is not made available to the anode, which consequently dries out, again with a loss in cell efficiency. It is therefore important that, under dry operating conditions, the membrane maintains a high proton transport capability and efficiently transfers water generated during the cell operation from one side of the membrane to the other.

A preferred way of obtaining a membrane with these characteristics is to use an ionomer having a high number of ion exchange groups and to reduce the thickness of the membrane.

The number of ion exchange groups in an ionomer is typically indicated by the equivalent weight of the ionomer. The lower the equivalent weight, the higher the percentage of sulfonic groups present in the chain.

One problem encountered in the preparation of ionomers with low equivalent weight, typically lower than 750 g/eq, is that, in general, the molecular weight of the precursor sulfonyl fluoride polymer, and consequently of the ionomer, is reduced.

Low molecular weight polymers result in scarce mechanical properties, which in turn means inadequate properties of the final proton exchange membrane. Moreover, a low molecular weight of the polymer renders impractical to process the polymer by melt extrusion.

On the other hand, melt extrusion would be an advantageous process for the production of thin polymeric films. Melt extrusion requires the starting polymer not only to be thermally stable at the processing temperatures but also to possess an adequate melt rehology, which is partly dependent on the molecular weight of the polymer.

It would therefore be desirable that sulfonyl fluoride polymers used for the production of films by melt extrusion processes be provided with no or limited loss of volatile substances at the melt processing temperatures.

Furthermore, it would be desirable to have available sulfonyl fluoride polymers, precursors of low equivalent weight ionomers, which are melt processable and have no or limited loss of volatile substances at their melt processing temperatures.

SUMMARY OF THE INVENTION

An objective of the invention is to provide a process for the isolation of sulfonyl fluoride polymers from a polymerization latex which provides for a reduced content of volatile substances in the sulfonyl fluoride polymer that can be volatilized at the melt processing temperatures, as indicated by the reduced loss of weight of the polymer at high temperatures, in particular at 200° C. According to this process the sulfonyl fluoride polymer is isolated from the polymerization latex by addition under high shear stirring to an electrolyte solution held at a temperature equal to or lower than the glass transition temperature of the polymer.

Another objective of the invention is to provide a process of preparing a polymerization latex comprising sulfonyl fluoride polymers with sufficiently high molecular weight to be melt processable and characterized by an equivalent weight lower than 700 g/eq when converted into acid form.

A further objective of the present invention is a polymer comprising recurring units of at least one ethylenically unsaturated (per)fluorinated monomer containing at least one sulfonyl fluoride group characterized by a loss of weight at 200° C. lower than 1%. Preferably the loss of weight is lower than 0.8%, more preferably lower than 0.7%, even more preferably lower than 0.5% by weight as measured by thermogravimetric analysis (TGA) according to ASTM E 1131-86.

In an aspect of the invention the sulfonyl fluoride polymer comprises recurring units of at least one ethylenically unsaturated (per)fluorinated monomer containing at least one sulfonyl fluoride group in an amount sufficient to provide a polymer having an equivalent weight of less than 750 g/eq when converted into acid form. Preferably the monomer containing at least one sulfonyl fluoride group is present in an amount sufficient to provide a polymer having an equivalent weight less than 700 g/eq when converted into acid form. The monomer containing at least one sulfonyl fluoride group is present in an amount sufficient to provide a polymer having an equivalent weight of at least 400 g/eq when converted into acid form.

In a further aspect of the invention the melt flow rate of the sulfonyl fluoride polymer does not exceed 50, preferably it does not exceed 45, more preferably it does not exceed 40 g/10 min when measured according to ASTM D1238-04 at 200° C./5 kg. The melt flow rate of the sulfonyl fluoride polymer is at least 0.1, preferably at least 0.2, more preferably at least 0.5 g/10 min when measured according to ASTM D1238-04 at 200° C./5 kg.

Further objectives of the present invention are an extruded film made of the sulfonyl fluoride polymer as well as a proton exchange membrane comprising the extruded film in hydrolysed form, i.e. wherein the sulfonyl fluoride polymer making the extruded film has been converted into its acid form by hydrolysis.

Definitions

The term (per)fluorinated is used herein to refer to compounds (e.g. monomers, polymers etc.) that are either totally or partially fluorinated, i.e wherein all or only a part of the hydrogen atoms have been replaced by fluorine atoms.

The expression "sulfonyl fluoride polymer" is used herein to refer to a (per)fluorinated polymer comprising recurring units of at least one ethylenically unsaturated (per)fluorinated monomer containing at least one sulfonyl fluoride group (—$SO_2F$).

The term "ionomer" is used in the present application to refer to a (per)fluorinated polymer comprising recurring units derived from at least one ethylenically unsaturated (per)fluorinated monomer comprising at least one ion exchange group —$SO_3^-$.

The term "equivalent weight" is defined as the weight of the polymer in acid form required to neutralize one equivalent of NaOH, wherein the phrase "acid form of a polymer" means that substantially all the ion exchange groups of the polymer are protonated.

The phrase "melt processable" is used herein to refer to a polymer that can be processed in the melt (i.e. fabricated into shaped articles such as films, fibres, tubes, wire coatings and the like) with conventional polymer processing equipment such as extruders and injection molding machines. Typically melt processable polymers have melt flow rates at the processing temperatures of from 0.1 to 100 g/10 min.

DETAILED DESCRIPTION OF THE INVENTION

The first object of the present invention is a process for the isolation of a sulfonyl fluoride polymer from a polymerization latex comprising adding under high shear stirring said latex to an aqueous electrolyte solution held at a temperature below the glass transition temperature of the polymer.

The process allows to obtain sulfonyl fluoride polymers with a reduced content of volatile substances, in particular sulfonyl fluoride polymers having a loss of weight at 200° C. lower than 1% as measured by thermogravimetric analysis.

The process has been found to be particularly advantageous for the isolation of sulfonyl fluoride polymers containing a high amount of ethylenically unsaturated (per) fluorinated monomer containing at least one sulfonyl fluoride group, typically an amount sufficient to provide a polymer having an equivalent weight of less than 750 g/eq when converted into its acid form.

The expression "polymerization latex" is used herein to refer to a latex (or dispersion of a sulfonyl fluoride polymer) obtained directly by a dispersed phase polymerization process of at least one ethylenically unsaturated (per)fluorinated monomer containing at least one sulfonyl fluoride group. For the purpose of the present invention a "dispersed phase polymerization process" includes dispersion or emulsion, including microemulsion or miniemulsion, polymerization processes. The polymerization latex is advantageously obtained by any process comprising a dispersed phase polymerization step.

The term "latex" is used to denote a colloid in which solid polymer particles having a size of between 1 and 1000 nm are dispersed in a suspending medium. Preferably the suspending medium is water.

The sulfonyl fluoride polymer dispersed in the polymerization latex comprises recurring units derived from at least one ethylenically unsaturated (per)fluorinated monomer (A) containing at least one sulfonyl fluoride group.

Preferably the sulfonyl fluoride polymer comprises recurring units derived from at least one monomer (A) and at least one ethylenically unsaturated (per)fluorinated monomer (B).

The phrase "at least one monomer" is used herein with reference to monomers of both type (A) and (B) to indicate that one or more than one monomer of each type can be present in the polymer. Hereinafter the term monomer will be used to refer to both one or more than one monomer of a given type.

Non limiting examples of suitable monomers (A) are:
sulfonyl fluoride (per)fluoroolefins of formula: $CF_2=CF(CF_2)_nSO_2F$
wherein n is an integer between 0 and 6, preferably n is equal to 2 or 3;
sulfonyl fluoride (per)fluorovinylethers of formula: $CF_2=CF-O-(CF_2)_mSO_2F$
wherein m is an integer between 1 and 10, preferably between 1 and 6, more preferably between 2 and 4, even more preferably m equals 2;
sulfonyl fluoride (per)fluoroalkoxyvinylethers of formula: $CF_2=CF-(OCF_2CF(RF_1))_w-O-CF_2(CF(RF_2))_y SO_2F$
wherein w is an integer between 0 and 2, $RF_1$ and $RF_2$, equal or different from each other, are independently —F, —Cl or a $C_1$-$C_{10}$ perfluoroalkyl group, optionally substituted with one or more ether oxygens, y is an integer between 0 and 6; preferably w is 1, $RF_1$ is —$CF_3$, y is 1 and $RF_2$ is —F;
sulfonyl fluoride aromatic (per)fluoroolefins of formula $CF_2=CF-Ar-SO_2F$
wherein Ar is a $C_5$-$C_{15}$ aromatic or heteroaromatic substituent.

Preferably monomer (A) is selected from the group of the sulfonyl fluoride perfluorovinylethers of formula $CF_2=CF-O-(CF_2)_m-SO_2F$, wherein m is an integer between 1 and 6, preferably between 2 and 4.

More preferably monomer (A) is $CF_2=CFOCF_2CF_2-SO_2F$ (perfluoro-5-sulfonylfluoride-3-oxa-1-pentene).

Preferably monomer (A) is present in an amount sufficient to provide a polymer having an equivalent weight of less than 750 g/eq when converted into its acid form.

Non limiting examples of suitable ethylenically unsaturated (per)fluorinated monomers of type (B) are:
- $C_2$-$C_8$ (per)fluoroolefins, such as tetrafluoroethylene (TFE), pentafluoropropylene, hexafluoropropylene (HFP), and hexafluoroisobutylene;
- vinylidene fluoride (VDF);
- $C_2$-$C_8$ chloro- and/or bromo- and/or iodo-(per)fluoroolefins, such as chlorotrifluoroethylene (CTFE) and bromotrifluoroethylene;
- (per)fluoroalkylvinylethers of formula $CF_2=CFOR_{f1}$, wherein $R_{f1}$ is a $C_1$-$C_6$ (per)fluoroalkyl, e.g. —$CF_3$, —$C_2F_5$, —$C_3F_7$;
- (per)fluoro-oxyalkylvinylethers of formula $CF_2=CFOX$, wherein X is a $C_1$-$C_{12}$ perfluoro-oxyalkyl having one or more ether groups, for example perfluoro-2-propoxy-propyl;
- fluoroalkyl-methoxy-vinylethers of formula $CF_2=CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
- fluorodioxoles, of formula:

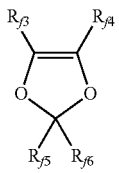

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Preferably monomer (B) is selected among:
- $C_3$-$C_8$ perfluoroolefins, preferably tetrafluoroethylene (TFE) and/or hexafluoropropylene (HFP);
- chloro- and/or bromo- and/or iodo-$C_2$-$C_6$ (per)fluoroolefins, like chlorotrifluoroethylene (CTFE) and/or bromotrifluoroethylene;
- perfluoroalkylvinylethers of formula $CF_2=CFOR_{f1}$ in which $R_{f1}$ is a $C_1$-$C_6$ perfluoroalkyl, e.g. —$CF_3$, —$C_2F_5$, —$C_3F_7$;
- perfluoro-oxyalkylvinylethers of formula $CF_2=CFOX$, in which X is a $C_1$-$C_{12}$ perfluorooxyalkyl having one or more ether groups, like perfluoro-2-propoxy-propyl.

More preferably monomer (B) is TFE.

Optionally, in addition to monomers (A) and (B) bis-olefins can be used in the process of the present invention. Non limiting examples of suitable bis-olefins are selected form those of formulae below:
- $R_1R_2C=CH-(CF_2)_j-CH=CR_3R_4$ wherein j is an integer between 2 and 10, preferably between 4 and 8, and $R_1$, $R_2$, $R_3$, $R_4$, equal or different from each other, are —H, —F or $C_1$-$C_5$ alkyl or (per)fluoroalkyl group;
- $A_2C=CB-O-E-O-CB=CA_2$ wherein each of A, equal or different from each other, is independently selected from —F, —Cl, and —H; each of B, equal or different from each other is independently selected from —F, —Cl, —H and —$OR_B$, wherein $R_B$ is a branched or straight chain alkyl radical which can be partially, substantially or completely fluorinated or chlorinated; E is a divalent group having 2 to 10 carbon atoms, optionally fluorinated, which may be inserted with ether linkages; preferably E is a —$(CF_2)_z$— group, with z being an integer from 3 to 5; a preferred bis-olefin is $F_2C=CF-O-(CF_2)_5-O-CF=CF_2$;
- $R_6R_7C=CR_5-E-O-CB=CA_2$, wherein E, A and B have the same meaning as above defined; $R_5$, $R_6$, $R_7$, equal or different from each other, are —H, —F or $C_1$-$C_5$ alkyl or (per)fluoroalkyl group.

When a bis-olefin is employed in the polymerization process of the invention the resulting polymer typically comprises from 0.01% to 5% by moles of units deriving from the bis-olefin with respect to the total amount of units in the polymer.

Optionally, in addition to monomers (A) and (B) brominated and/or iodinated monomers may also be used in the process of the present invention to provide iodine and/or bromine atoms in the sulfonyl fluoride polymer chain as possible cure sites in cross-linking reactions. Suitable monomers are for instance bromo- and/or iodo-olefins having from 2 to 10 carbon atoms, or iodo- and/or bromo-fluoroalkylvinylethers. Typically brominated and/or iodinated monomers are added in amounts of from 0.05 to 2% by moles with respect to the total amount of monomers in the polymer. The introduction of iodine and/or bromine atoms in the sulfonyl fluoride polymer chain can be carried out, alternatively or additionally, by addition during the polymerization process of chain transfer agents containing iodine or bromine atoms. Suitable chain transfer agents are, for example, alkaline or alkaline-earth metal iodides and/or bromides or compounds of formula $R_{g1}(I)_d(Br)_e$, wherein $R_{g1}$ is a (per)fluoroalkyl or a (per)fluorochloroalkyl chain having from 1 to 8 carbon atoms, while d and e are integers between 0 and 2, with d+e comprised between 1 and 2. Chain transfer agents containing iodine or bromine atoms are preferably used in combination with monomer units derived from bis-olefins.

The polymerization latex suitable for the isolation process of the invention may be conveniently obtained by any dispersed phase polymerization process. Suitable processes for the preparation of polymerization latexes are instance those described in U.S. Pat. No. 4,940,525, EP-A-1,167,400, EP-A-1,323,751, EP-A-1,172,382.

In a typical dispersed phase polymerization process, such as the process described in EP-A-1,323,751 the following general steps can be identified:
- formation of an emulsion (or solution) containing water, a surfactant and at least one ethylenically unsaturated (per)fluorinated monomer comprising at least one sulfonyl fluoride group at the polymerization temperature;
- addition to said emulsion (or solution) of at least one ethylenically unsaturated (per)fluorinated monomer when present;
- addition of a free radical initiator at said polymerization temperature to initiate the polymerization reaction;
- optionally feeding of the ethylenically unsaturated (per)fluorinated monomer(s) for a period of time;
- recovery of the polymerization latex.

Dispersed phase polymerization processes are generally carried out in a liquid medium comprising water.

The polymerization latex comprising the sulfonyl fluoride polymer may conveniently be prepared according to an alternative dispersed phase polymerization process.

Accordingly, a second object of the invention is a process for the preparation of a polymerization latex, said process comprising the polymerization of recurring units derived from:

at least one monomer (A); and optionally, at least one monomer (B), in a liquid phase in the presence of a free radical initiator, at least a portion of said free radical initiator being added to the liquid phase held at a temperature T1, said process characterised in that after an incubation time the temperature of the liquid phase is brought to a temperature T2 lower than T1.

Monomers (A) and (B) are as above defined.

Preferably, monomer (A) is present in an amount such that the equivalent weight of the polymer when converted into its acid form is less than 750, preferably less than 700, more preferably less than 690, even more preferably less than 680 g/eq. Monomer (A) is present in an amount such that the equivalent weight of the polymer when converted into its acid form is at least 400, preferably at least 450, more preferably at least 500 g/eq.

The process of the invention is carried out in the presence of water. Typically water is at least 30%, preferably at least 40% by weight with respect of the total weight of the liquid phase. The expression "liquid phase" is used herein to indicate the continuous aqueous phase wherein the dispersed organic phase is suspended. The organic phase may typically comprise, among the others, monomers, surfactants, oligomers and polymer chains.

This process advantageously provides polymerization latexes comprising sulfonyl fluoride polymers characterized by a melt flow rate (measured according to ASTM D1238-04 at 200° C./5 kg) that does not exceed 50 g/10 min. The melt flow rate of the polymer is at least 0.1 g/10 min (measured according to ASTM D1238-04 at 200° C./5 kg).

In an embodiment of the invention the polymerization latex is obtained by means of an emulsion, including miniemulsion or microemulsion, polymerization process. Emulsion of the liquid monomer, typically of the monomer containing the sulfonyl fluoride group, in water can be prepared, for instance, by high speed mechanical stirring of a mixture of the monomer and water in the presence of a surfactant.

Suitable surfactants for the process of the present invention are for instance anionic fluorinated surfactants, for example salts of fluorinated carboxylic acids or of sulphonic acids, having a perfluoro-polyether or perfluorocarbon structure or partially fluorinated, cationic surfactant, for example quaternary ammonium fluorinated salts, or even fluorinated non ionic surfactants. The above surfactants can be also used in mixtures.

Non limiting examples of surfactants having a perfluorocarbon structure are for instance ammonium or alkaline metal salts of $C_8$-$C_{10}$ perfluorcarboxylic acids or perfluorooxycarboxylates of formula $R_sO-CF_2CF_2-O-CF_2-COOX_a$ wherein $R_s$ is a perfluoro(oxy)alkyl group, and $X_a$ is H, a monovalent metal or an ammonium group of formula $NR^N_4$, with $R^N$, equal or different at each occurrence, being H or a $C_{1-6}$ hydrocarbon group.

Non limiting examples of surfactants having a perfluoropolyether structure are for instance selected from those with formula $F_2ClO(CF_2CF(CF_3)O)_p(CF_2O)_qCF_2COOR'$ wherein R'=H, Na, K, $NH_4$, p/q=10. Generally these fluorinated surfactant(s) have an average molecular weight in the range 500-700.

Monomer (B), when present, is introduced into the reactor at the same time, before or after the introduction of monomer (A).

The liquid phase is brought to a first temperature T1. As in typical free radical polymerization reactions temperature T1 will be chosen with regard to the decomposition temperature of the initiator selected.

Any initiator or initiator system suitable for free radical polymerization may be used in the process of the present invention. Non limiting examples of suitable free radical initiators are for instance organic initiators selected among bis(fluoroacyl)peroxides, bis(chlorofluoroacyl)peroxides, dialkyl peroxydicarbonates, diacyl peroxides, peroxyesters, azo compounds or inorganic initiators such as ammonium and/or potassium and/or sodium persulphate, optionally in combination with ferrous, cupreous or silver salts or a redox system such as ammonium persulphate/disulfite and potassium permanganate. Preferably the free radical initiator used in the process of the present invention is an inorganic initiator soluble in the aqueous phase, more preferably ammonium and/or potassium and/or sodium persulphate.

Typically T1 will be at least 0° C., preferably at least 15° C., more preferably at least 20° C. and even more preferably at least 30° C. Temperature T1 will generally not exceed 150° C., preferably will not exceed 120° C., more preferably will not exceed 100° C., even more preferably will not exceed 80° C.

The maximum and minimum values of T1 will depend on the free radical initiator. When, in a preferred embodiment of the process, the initiator is selected among ammonium, potassium and sodium persulphate temperature T1 is at least 25° C., preferably at least 30° C., more preferably at least 40° C. and even more preferably at least 55° C. T1 does not exceed 150° C., preferably does not exceed 100° C., more preferably does not exceed 80°, even more preferably does not exceed 65° C.

The appropriate range for temperature T1 for a given free radical initiator can be identified by the person skilled in the art by routine experiments.

When the liquid phase is at temperature T1 at least a portion of the initiator is fed to the reactor. After a time sufficient for the polymerization reaction to start, defined herein as "incubation time", the temperature of the liquid phase is brought to a temperature T2 lower than T1. The incubation time corresponds to the time required for the initiator to decompose and generate a sufficient amount of active polymer chain carriers to start the polymerization reaction. Active polymer chain carriers are the active radical centers from which polymer particles are grown. In such a way it is possible to perform the initiation phase of the polymerization reaction at a first condition, which favours the formation of a high number of active polymer chain carriers (e.g. at T1), and then performing the propagation phase of the polymerization reaction at a second condition, which favours monomer incorporation over the chain termination reactions (e.g. at T2).

The incubation time is generally at least 5 seconds, preferably at least 10 seconds, more preferably at least 30 seconds, even more preferably at least 1 minute. The incubation time generally does not exceed 1 hour.

The incubation time can be defined for any given system of monomers, initiator and temperature by routine experiments. For instance, when at least one of the monomers is a gas, the incubation time may be taken as the time required for the pressure inside the reactor to reach a certain value with respect to its value at the time the initiator was added.

As discussed above for T1, T2 will depend on the choice of the free radical initiator. Typically T2 is at least 5° C. lower than T1, preferably between 5 and 15° C. lower than T1, more preferably between 5 and 10° C. lower than T1.

For instance, when the initiator is selected among ammonium, potassium and sodium persulphate T2 is at least 25°

C., preferably at least 30° C., more preferably at least 40° C. Temperature T2 does not exceed 55° C., preferably it does not exceed 50° C.

The polymerization system may optionally comprise small amounts of auxiliaries such as buffers, complex-formers, chain transfer agents or perfluorinated oils such as those used in microemulsion processes, for instance those having formula $CF_3O(CF_2-CF(CF_3)O)_l(CF_2O)_kCF_3$ wherein l/k=20 (average molecular weight in the range 400-600) which are commercially available from Solvay Solexis SpA (Bollate, Italy) under the trade name Galden® D02.

The polymerization can be carried out at any suitable pH, pH is typically not critical but depends on the initiator system used. To avoid the conversion of the sulfonyl fluoride group into the ionic form during polymerization, the pH is typically equal to or lower than 7, more typically equal to or lower than 6.

In an embodiment of the polymerization process monomer (B) is a gaseous monomer, preferably TFE. When gaseous monomers are used the pressure inside the reactor is generally employed to control the ratio of the gaseous monomer to the liquid monomer. The polymerization reaction is typically carried out under a partial pressure of the gaseous monomer of at least 0.1 MPa, preferably of at least 0.2 MPa. The pressure does not exceed 1.5 MPa, preferably 1 MPa, even more preferably 0.8 MPa.

In the particular case where the initiator is added to the reactor as an aqueous solution, which causes an increase in the pressure within the reactor, the incubation time can conveniently be taken to be the time required by the pressure inside the reactor to resume the value prior to the addition of the initiator solution.

When the pressure inside the reactor has returned to the value before addition of the initiator solution, the temperature of the liquid phase is brought to temperature T2 lower than T1.

At the end of the polymerization reaction the pressure inside the reactor is lowered by venting any unreacted gaseous monomer and the polymerization latex is discharged from the reactor.

Alternatively, after venting of the reactor to remove the unreacted gaseous monomer vacuum is created inside the reactor to remove from the latex any additional volatile compound, such as any residual unreacted liquid monomer. This operation is typically carried out under stirring at a residual pressure inside the reactor of from 0.01 to 0.05 MPa.

At the end of the polymerization reaction a polymerization latex is obtained. Typically, the solid content of the latex is between 10 and 50% by weight.

Traces of other polymerization additives and/or polymerization residues may be emulsified and/or dissolved in the latex. Examples of such other polymerization additives and residues are for instance: chain transfer agents, initiators, unreacted monomers, low molecular weight perfluorocarbons, soluble oligomers, etc.

The addition of the polymerization latex to the aqueous electrolyte solution is carried out under high shear stirring.

The phrase "high shear stirring" is used herein to refer to a rate of stirring such that the Reynolds number is greater than 10,000. The Reynolds number (Re) is calculated from the following formula:

$$Re = \rho \cdot N \cdot d_I^2 / \mu$$

wherein $\rho$ is the density of water (kg/m$^3$), N the number of revolutions per second of the impeller (1/s), $d_I$ the diameter of the impeller (m) and $\mu$ the dynamic viscosity of water (Pa·s).

Typically, the diameter of the vessel is chosen such that is does not exceed 2 to 4 times the diameter of the impeller.

Electrolytes suitable for the isolation process are salts such as $Al(NO_3)_3$, $Al_2(SO_4)_3$, $Ca(NO_3)_2$, $Zn(NO_3)_2$, $ZnSO_4$, $CaCl_2$, $(NH_4)_2SO_4$, $NH_4NO_3$, $Na_2SO_4$, $NaHSO_4$, $MgSO_4$ as well as acids such as $HNO_3$, HCl, $H_2SO_4$, citric acid. Preferably the electrolyte is selected from the group consisting of $HNO_3$, $Al(NO_3)_3$, $Al_2(SO_4)_3$, $Ca(NO_3)_2$, $Zn(NO_3)_2$, $ZnSO_4$, $CaCl_2$, $MgSO_4$.

Preferably the electrolyte is selected from the group consisting of $Al(NO_3)_3$, $Al_2(SO_4)_3$, $Ca(NO_3)_2$, $Zn(NO_3)_2$, $ZnSO_4$, $CaCl_2$, $MgSO_4$. Even more preferably the electrolyte is $Al_2(SO_4)_3$.

Typically the concentration of the electrolyte in the aqueous solution is at least 3 g/l, preferably at least 4 g/l. The concentration of the electrolyte can be up to 50 g/l, preferably up to 40 g/l.

The volume of the electrolyte solution is generally adjusted so that the ratio between the volume of the electrolyte solution and the volume of the polymerization latex is at least 1:1, preferably at least 1.5:1.

The electrolyte solution is held at a temperature equal to or lower than the glass transition temperature of the polymer. For instance, copolymers of TFE and $CF_2=CFOCF_2CF_2-SO_2F$ precursors to ionomers with an equivalent weight in the range from 1180 to 650 g/eq have glass transition temperatures in the range from 50 to 15° C., respectively.

Anti-freezing agents, such as alcohols, may be added to the aqueous electrolyte solution to avoid freezing when temperatures below 0° C. are required for the isolation process.

After addition of the polymerization latex to the aqueous electrolyte solution the coagulated polymer is separated from the liquid phase and washed according to standard procedures.

Typically the coagulated polymer is treated with an aqueous solution of a diluted acid followed by washing with deionized water.

The dried polymer may then be subjected to conventional post-treatment and pelletization procedures. For instance, the polymer may be subjected to a fluorination treatment to remove unstable chain-end groups as known in the art.

The sulfonyl fluoride polymers coagulated according to the inventive process are characterized by a lower amount of volatile low molecular weight components than polymers isolated by other conventional methods, such as by freeze-thawing. The amount of low molecular weight components is measured by the loss of weight of the polymer at high temperature.

Accordingly the third object of the present invention is a (per)fluorinated polymer comprising recurring units derived from:
  at least one monomer (A); and
  optionally, at least one monomer (B),
    said polymer having a loss of weight at 200° C. lower than 1% as measured by TGA according to method ASTM E 1131-86.

Monomers (A) and (B) are as defined above.

Preferably the polymer of the present invention is a copolymer of TFE and $CF_2=CFOCF_2CF_2-SO_2F$ and optionally a bis-olefin as above defined.

Preferably the loss of weight at 200° C. is lower than 0.8%, more preferably lower than 0.7%, even more preferably lower than 0.5%.

A low weight loss of the polymer indicates a reduced content of volatile components in the polymer itself. The absence of volatile components, in particular those that can be volatilized during the polymer extrusion process, is advantageous when processing the polymer into a film by means of extrusion.

The equivalent weight of the sulfonyl fluoride polymer of the invention when converted into its acid form may range from 380 to 1800 g/eq. Preferably the equivalent weight is less than 800, preferably less than 750, more preferably less than 730, even more preferably less than 700 g/eq. The equivalent weight is at least 400, preferably at least 450, more preferably at least 480, even more preferably at least 500 g/eq.

The sulfonyl fluoride polymer has a melt flow rate measured according to ASTM D1238-04 at 200° C./5 kg of less than 50, preferably of less than 45, more preferably of less than 40 g/10 min.

The sulfonyl fluoride polymer has a melt flow rate measured according to ASTM D1238-04 at 200° C./5 kg of at least 0.1, preferably of at least 0.2 more preferably of at least 0.5 g/10 min.

Advantageously the sulfonyl fluoride polymer of the invention has a melt flow rate of less than 50, preferably of less than 45, more preferably of less than 40 g/10 min (measured according to ASTM D1238-04 at 200° C./5 kg) and an equivalent weight when converted into its acid form of less than 700 g/eq.

Typically the complex melt viscosity of the sulfonyl fluoride polymer of the invention measured according to ASTM D4440-01 at 160° C. is greater than 800 Pa·s at 10 rad/s and greater than 1100 Pa·s at 1 rad/s.

The polymers of the invention may be converted into films by conventional film extrusion equipment. Typically the sulfonyl fluoride polymers of the invention may be melt processed at temperatures of from 120 to 250° C., preferably of from 150 to 220° C. Typically the films have a thickness of less than 250 μm, preferably in the range from 1 to 150 μm, preferably from 3 to 100 μm, more preferably from 5 to 60 μm, even more preferably from 5 to 30 μm.

The extruded films can subsequently be converted into electrolyte membranes by hydrolysis, i.e. conversion of the sulfonyl fluoride polymer making the film into the corresponding acid form, according to methods known in the art.

The membranes of the present invention may optionally be reinforced, for instance by lamination of the extruded film to a porous support. Lamination may be carried out by conventional methods, such as hot lamination or glue lamination. Lamination is typically carried out on the film before conversion of the sulfonyl fluoride groups into their acid form.

Porous supports may be made from a wide variety of components. The porous supports may be made from hydrocarbon polymers such as polyolefins, e.g. polyethylene or polypropylene, or polyesters, e.g. poly(ethylene terephthalate). (Per)halogenated polymers, such as poly(chlorotrifluoroethylene) and copolymer of chlorotrifluoroethylene and ethylene may also be used. Higher temperature and chemical resistance may be obtained when the porous support is made of perfluorinated polymers such as PTFE. Typical perfluorinated porous supports are chosen from bistretched PTFE and uniaxially stretched PTFE films.

Should the disclosure of any of the patents, patent applications, and publications that are incorporated herein by reference conflict with the present description to the extent that it might render a term unclear, the present description shall take precedence.

The invention will be illustrated by means of the following non-limiting examples.

EXAMPLES

Characterization

Melt flow rate was measured following the procedure of ASTM D1238-04 at a temperature of 200° C. and under a weight of 5 kg.

Glass transition temperature was determined by DSC at a heating rate of 20° C./min following the procedure of ASTM D3418-03. The indicated value corresponds to the midpoint temperature.

Determination of the Equivalent Weight

The equivalent weight was determined according to the following procedure. A film was prepared from a sample of dry polymer by heating and pressing it at 200° C. in a press. A film sample (10 cm×10 cm) was cut and treated with a 10% by weight (wt %) aqueous KOH solution at 80° C. for 24 hours. After washing with deionized water, the film was treated with a 20 wt % aqueous $HNO_3$ solution (at room temperature for 1 hour) and washed with deionized water. After drying in vacuum at 80° C. for 16 hours, the film sample was weighed, dispersed in a hydro-alcoholic solution and a measured excess of a 0.1N NaOH solution was added. The alkaline excess was counter-titrated with a 0.1N HCl solution.

Complex Melt Viscosity Determination

The complex melt viscosity ($\eta^*$) was measured at 160° C. using a rheogoniometer Rheometrics RMS 800 according to ASTM D4440-01. The polymer sample was sheared in oscillatory mode between two 25 mm parallel plates under a dry nitrogen atmosphere. The range of frequency was between 0.05 and 100 rad/s.

Weight Loss Determination

The weight loss determination at 200° C. was carried out using a TGA PYRIS 1 equipment from Perkin-Elmer according to method ASTM E 1131. A 10 mg sample of the polymer was subjected to constant heating in air at a rate of 10° C./min from 23° C. up to 750° C. The weight loss was determined as the weight difference between 23° C. and 200° C.

General Polymer Isolation Procedure

An aqueous solution of $Al_2(SO_4)_3$ (concentration of 12 g/l) was introduced in a closed glass vessel and the temperature maintained at 10±2° C. under stirring. Stirring rate (stirrer revolutions per minute) was adjusted to obtain a Reynolds number greater than 10,000. The polymerization latex was slowly added to the aqueous solution in about 40 min in an amount of 1 kg per liter of $Al_2(SO_4)_3$ solution. Polymer coagulation started immediately. After addition of all the latex, the coagulated mixture was stirred, at the same rate and temperature, for 15 min. The stirring was stopped and the polymer allowed to settle. The liquid phase above the coagulum was removed. The coagulum was washed twice with an aqueous solution of $HNO_3$ (3 wt % in an amount of 1 l/l of initial $Al_2(SO_4)_3$ solution for each washing step) at a temperature between 10 and 15° C. and then twice with deionized water (in an amount of 1 l/l of initial $Al_2(SO_4)_3$ solution for each washing step) at the same rate and temperature as above. The coagulated polymer was then dried at 80° C. for 20 hours in a ventilated oven.

General Fluorination Procedure

Polymer pellets obtained by extrusion of the sulfonyl fluoride polymer were dried in a ventilated oven at 60° C. for 20 hours and treated with a gaseous $F_2$ (2.5 Nl/h)/$N_2$ (1 Nl/h) mixture at 40° C. for 20 hours. After treatment with the $F_2/N_2$ mixture, the material was further treated first with $N_2$ (5 Nl/h) for 4 hours at 40° C., and then at 60° C. for 20 hours in a ventilated oven.

Example 1

(1) Polymer Synthesis

In a 22 liter reactor, were introduced the following reactants: 3100 g of an aqueous solution containing 5 wt % of a surfactant of formula $CF_2ClO(CF_2CF(CF_3)O)_p(CF_2O)_q CF_2COOK$ (p/q=10, average molecular weight 527 g/mol) and 95 wt % of water; 9 l of deionized water; 756 ml of the monomer of formula $CF_2=CFOCF_2CF_2-SO_2F$.

The reactor, stirred at 540 rpm, was heated up to 60° C. The pressure inside the reactor was brought to 1.5 absolute MPa with a mixture of with carbon dioxide and TFE. The partial pressure of TFE inside the reactor was 0.41 MPa. 300 ml of an aqueous solution having a concentration of 35 g/l of potassium persulphate were fed into the reactor causing an increase in the pressure. The reaction started after 6 min as indicated by the lowering of the pressure within the reactor to its initial value. The reactor temperature was lowered to 50° C. The pressure was maintained constant by introducing TFE. During the polymerization, 160 ml of $CF_2=CFOCF_2CF_2-SO_2F$ were added every 160 g of TFE. The total mass of TFE fed into the reactor was 3200 g. The reaction was stopped after 447 min by venting TFE and successively lowering the reactor pressure until reaching 0.03 absolute MPa. At the end of this operation, stirring was slowed down and the reactor brought to ambient pressure and temperature recovering a polymerization latex with a solid content of 31.6 wt %.

The equivalent weight of the corresponding acid form of the polymer was determined to be 606 g/eq corresponding to 23.5% moles of $CF_2=CFOCF_2CF_2-SO_2F$.

(2) Polymer Isolation 250 g of the polymerization latex were coagulated according to the general polymer isolation procedure. The impeller (diameter $d_i$=5 cm) was set at a speed of 800 rpm corresponding to Re=24,690.

The polymer had the following properties: weight loss at 200° C.: 0.3%; glass transition temperature: 13° C.; melt flow rate (200° C./5 kg): 49.5 g/10 min; complex viscosity (at 160° C.): $\eta^*$=1210 Pa·s at 1 rad/s and $\eta^*$=910 Pa·s at 10 rad/s.

Comparative Example 1

250 g of the polymerization latex obtained in Example 1 were coagulated following the general polymer isolation procedure but maintaining the aqueous $Al_2(SO_4)_3$ solution at 60° C. Rinsing with $HNO_3$ and deionized water were carried out at room temperature. Weight loss of the polymer at 200° C. was 2.6%.

Comparative Example 2

250 g of the polymerization latex obtained in Example 1 were coagulated by freezing (20 h at −20° C.) and thawing (6 h at 23° C.). The coagulated polymer was separated from the liquid phase, washed at room temperature with water (4×1.5 liters) under high shear stirring (Re=20,830) and dried for 20 hours at 80° C.

The polymer had the following properties: weight loss at 200° C.: 4.4%; melt flow rate (200° C./5 kg): 50 g/10 min.

The polymer was milled into granules after cooling with liquid nitrogen. The granules were dried in a ventilated oven at 60° C. for 20 hours. The granular material was extruded into pellets using a twin screw extruder at a temperature of 125-135° C.

The polymer pellets had a light blue color, which was attributed to metals extracted during the pelletization phase. Signs of chemical degradation were detected in the extruder screw.

The melt flow rate measured on the pellets was 79 g/10 min (200° C./5 kg). Weight loss of the polymer pellets at 200° C. was 1.2%.

After the fluorination treatment the polymer pellets had a dark brown color indicating that material degradation and/or contamination had taken place.

The loss of weight of the polymer of Example 1 isolated according to the inventive polymer isolation process is almost 9 times lower than that of a polymer isolated from the same polymer latex but using an electrolyte solution held at a temperature (60° C.) higher than the glass transition temperature of the polymer (13° C.) (Comp. Example 1) and about 14 times lower than that of the polymer isolated from the same polymer latex using a conventional freeze-thawing method (Comp. Example 2).

Example 2

(1) Polymer Synthesis

Following the procedure of Example 1 a polymerization latex comprising a copolymer of TFE and $CF_2=CFOCF_2CF_2-SO_2F$ was prepared by setting the partial pressure of TFE at 0.46 absolute MPa and T1=60° C. After 6 minutes from the addition of the potassium persulphate initiator the temperature within the reactor was lowered to T2=50° C.

The polymerization latex had a solid content of 30.6 wt %.

The equivalent weight of the corresponding acid form of the polymer was determined to be 649 g/eq corresponding to 21.3% moles of $CF_2=CFOCF_2CF_2-SO_2F$.

(2) Polymer Isolation 7 kg of the polymerization latex were coagulated according to the general polymer isolation procedure. The impeller, with a diameter $d_i$=10 cm, was set at a speed of 650 rpm corresponding to Re=180,560.

The polymer had the following properties: weight loss at 200° C.: 0.05%; glass transition temperature: 14° C.; complex viscosity (at 160° C.):$\eta^*$=14,490 Pa·s at 1 rad/s and $\eta^*$=8150 Pa·s at 10 rad/s.

(3) Processing

The polymer was extruded into pellets with a twin screw extruder at a temperature of 125-135° C. The pellets were subjected to a fluorination treatment according to the general procedure described above.

The polymer pellets appeared translucent and colorless. The pellets had a melt flow rate (200° C./5 kg) of 19 g/10 min and a weight loss at 200° C. of 0.03%.

Example 3

(1) Polymer Synthesis

The procedure of Example 2 was repeated terminating the reaction after 404 minutes obtaining a polymerization latex with a solid content of 31% by weight.

The equivalent weight of the corresponding acid form of the polymer was determined to be 630 g/eq corresponding to 22.2% moles of $CF_2$=$CFOCF_2CF_2$—$SO_2F$.

(2) Polymer Isolation 250 g of the polymerization latex were coagulated according to the general polymer isolation procedure. The impeller, with a diameter $d_f$=5 cm, was set at a speed of 800 rpm corresponding to Re=24,690.

The polymer had the following properties: weight loss at 200° C.: 0.09%; glass transition temperature: 13° C.; melt flow rate (200° C./5 kg): 18 g/10 min.

Comparative Example 3

250 g of the polymerization latex obtained in Example 3 were coagulated by addition to a 0.5M aqueous $HNO_3$ solution at 23° C. under low shear stirring (Re=2130). The coagulated polymer was washed with deionized water and dried in a ventilated oven. Weight loss of the polymer at 200° C. was 2.6%.

The loss of weight of the polymer of Example 3 isolated according to the inventive polymer isolation process is almost 30 times lower than that of a polymer isolated from the same polymer latex under low shear stirring and using an electrolyte solution held at a temperature (23° C.) higher than the glass transition temperature of the polymer and (13° C.) (Comp. Example 3).

Example 4

(1) Polymer Synthesis

In a 22 liter reactor, were introduced the following reactants: 1350 g of a microemulsion previously obtained by mixing 473 g of a surfactant of formula $CF_2ClO(CF_2CF(CF_3)O)_p(CF_2O)_qCF_2COOK$ (p/q=10; average molecular weight 527 g/mol), 338 g of a perfluoropolyether oil of formula $CF_3O(CF_2$—$CF(CF_3)O)I(CF_2O)_kCF_3$ (l/k=20; average molecular weight 400-600; Galden® D02 Solvay Solexis SpA, Bollate, Italy) and 540 g of water; 10 l of deionized water; 756 ml of the monomer of formula $CF_2$=$CFOCF_2CF_2$—$SO_2F$.

The procedure of Example 1 was then followed by setting the partial pressure of TFE at 0.36 absolute MPa and T1=60° C. The reaction started after 5 seconds from the addition of 300 ml of an aqueous solution having a concentration of 30 g/l of potassium persulphate and the reactor temperature was lowered to 50° C. The pressure was maintained constant by introducing TFE. During the polymerization, 160 ml of $CF_2$=$CFOCF_2CF_2$—$SO_2F$ were added every 140 g of TFE. The total mass of TFE fed into the reactor was 2800 g. The reaction was stopped after 174 min recovering a polymerization latex with a solid content of 32 wt %.

The equivalent weight of the corresponding acid form of the polymer was determined to be 646 g/eq corresponding to 21.5% moles of $CF_2$=$CFOCF_2CF_2$—$SO_2F$.

(2) Polymer Isolation 250 g of the polymerization latex were coagulated according to the general polymer isolation procedure. Drying of the polymer was carried out in a ventilated oven at 180° C. for 20 hours. The impeller, with a diameter $d_f$=5 cm, was set at a speed of 800 rpm corresponding to Re=24,690.

The polymer had the following properties: weight loss at 200° C.: 0.6%; glass transition temperature: 14° C.; melt flow rate (200° C./5 kg): 8.5 g/10 min.

Comparative Example 4

250 g of the polymerization latex obtained in Example 3 were coagulated by freezing (20 h at −20° C.) and thawing (6 h at 23° C.). The coagulated polymer was separated from the liquid phase, washed at room temperature with water (4×1.5 l) under high shear stirring (Re=20,830) and dried for 20 hours at 80° C. Weight loss of the polymer at 200° C. was 3.3%.

Example 5

(1) Polymer Synthesis

In a 5 liter reactor, were introduced the following reactants: 720 g of an aqueous solution containing 5 wt % of a surfactant of formula $CF_2ClO(CF_2CF(CF_3)O)_p(CF_2O)_qCF_2COOK$ (p/q=10, average molecular weight 527 g/mol) and 95 wt % of water; 2.6 l of deionized water; 134 ml of the monomer of formula $CF_2$=$CFOCF_2CF_2$—$SO_2F$.

The reactor, stirred at 650 rpm, was heated up to 60° C. The pressure inside the reactor was brought to 0.9 absolute MPa with TFE. 66 ml of an aqueous solution having a concentration of 18 g/l of potassium persulphate were fed into the reactor causing an increase in the pressure. The reaction started after 5 min as indicated by the lowering of the pressure within the reactor to its initial value. The temperature was maintained at 60° C. throughout the polymerization reaction. The pressure was maintained constant by introducing TFE. During the polymerization, 36.6 ml of $CF_2$=$CFOCF_2CF_2$—$SO_2F$ were added every 45 g of TFE. The total mass of TFE fed into the reactor was 900 g. The reaction was stopped after 426 min by venting TFE, stirring was slowed down and the reactor brought to room temperature recovering a polymerization latex with a solid content of 26 wt %.

The equivalent weight of the corresponding acid form of the polymer was determined to be 596 g/eq corresponding to 24% moles of $CF_2$=$CFOCF_2CF_2$—$SO_2F$.

(2) Polymer Isolation 250 g of the polymerization latex were coagulated according to the general polymer isolation procedure. The impeller, with a diameter $d_f$=5 cm, was set at a speed of 800 rpm corresponding to Re=24,690.

The polymer had the following properties: weight loss at 200° C.: 0.2%; glass transition temperature: 12° C.; melt flow rate (200° C./5 kg): 186.7 g/10 min.

Comparative Example 5

250 g of the polymerization latex obtained in Example 5 were coagulated by freezing (20 h at −20° C.) and thawing (6 h at 23° C.). The coagulated polymer was separated from the liquid phase, washed at room temperature with water (4×1.5 l) under high shear stirring (Re=20,830) and dried for 20 hours at 80° C. Weight loss of the polymer at 200° C. was 1.4%.

The loss of weight of the polymer of Example 5 isolated according to the inventive polymer isolation process is almost 7 times lower than that of a polymer isolated from the same polymer latex using a conventional freeze-thawing method (Comp. Example 5).

The invention claimed is:

1. A process for the isolation of a polymer from a polymerization latex, the process comprising adding said latex under high shear stirring to an aqueous electrolyte solution held at a temperature equal to or lower than the glass transition temperature of the polymer wherein said polymer comprises recurring units derived from at least one ethylenically unsaturated (per)fluorinated monomer (A) containing at least one sulfonyl fluoride group, wherein said polymer exhibits a loss of weight at 200° C. lower than 1% as measured by thermogravimetric analysis according to ASTM E1131-86, and wherein said polymer exhibits a melt flow rate measured according to ASTM D1238-04 at 200° C./5kg of less than 50 g/10 min.

2. The process of claim 1 wherein the rate of stirring is such that the Reynolds number $Re=\rho \cdot N \cdot d_I^2/\mu$ wherein $\rho$ is the density of water (kg/m$^3$), N the number of revolutions per second of the impeller (1/s), $d_I$ the diameter of the impeller (m) and $\mu$ the dynamic viscosity of water (Pa·s) is greater than 10,000.

3. The process of claim 1 wherein the electrolyte is selected from the group consisting of $HNO_3$, $Al(NO_3)_3$, $Al_2(SO_4)_3$, $Ca(NO_3)_2$, $Zn(NO_3)_2$, $ZnSO_4$, $CaCl_2$, and $MgSO_4$.

* * * * *